United States Patent
Aute et al.

(10) Patent No.: US 9,569,492 B2
(45) Date of Patent: *Feb. 14, 2017

(54) COALESCING OPERATION FOR QUERY PROCESSING

(71) Applicant: International Business Machines Corporation, Armonk, NY (US)

(72) Inventors: Ravindra D. Aute, Olathe, KS (US); Venkatesh S. Gopal, Overland Park, KS (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/148,944

(22) Filed: Jan. 7, 2014

(65) Prior Publication Data

US 2015/0193500 A1    Jul. 9, 2015

(51) Int. Cl.
*G06F 7/00* (2006.01)
*G06F 17/30* (2006.01)

(52) U.S. Cl.
CPC ... *G06F 17/30463* (2013.01); *G06F 17/30454* (2013.01); *G06F 17/30466* (2013.01)

(58) Field of Classification Search
CPC ................ G06F 17/30466; G06F 17/30463; G06F 17/30454
USPC .......................... 707/713, 714, 718, 999.002
See application file for complete search history.

(56) References Cited

U.S. PATENT DOCUMENTS

| | | | |
|---|---|---|---|
| 5,335,345 A * | 8/1994 | Frieder | G06F 17/30474 |
| 8,078,652 B2 | 12/2011 | Basu et al. | |
| 8,224,806 B2 | 7/2012 | Al-Omari et al. | |
| 2007/0168053 A1* | 7/2007 | Hendrickson | G05B 15/02 700/28 |
| 2008/0288444 A1 | 11/2008 | Edwards et al. | |
| 2010/0257198 A1* | 10/2010 | Cohen | G06F 17/30557 707/770 |
| 2012/0169615 A1* | 7/2012 | Chang | G06F 3/0488 345/173 |
| 2013/0152088 A1 | 6/2013 | Gkantsidis et al. | |
| 2014/0095471 A1* | 4/2014 | Deshmukh | G06F 17/30463 707/714 |
| 2014/0351432 A1* | 11/2014 | Koponen | H04L 45/64 709/224 |

* cited by examiner

*Primary Examiner* — Md. I Uddin
(74) *Attorney, Agent, or Firm* — Mohammed Kashef; Edell, Shapiro & Finnan, LLC

(57) ABSTRACT

According to one embodiment of the present invention, a system for processing queries analyzes statistical information of input data records in relation to a first operation for a query. The system applies the first operation to a plurality of groups of input data records to produce corresponding groups of output data records, and coalesces the sets of output data records to form larger sets of data records for input to a subsequent second operation for the query based on the analysis. Embodiments of the present invention further include a method and computer program product for processing queries in substantially the same manners described above.

11 Claims, 5 Drawing Sheets

COALESCING OPERATION FOR QUERY PROCESSING

BACKGROUND

1. Technical Field

Present invention embodiments relate to processing queries, and more specifically, to introducing operations for coalescing subsets of intermediate results into a query plan.

2. Discussion of the Related Art

In a relational database management system (RDBMS), data is conceptually organized into tables consisting of a set of rows (records) and columns (attributes). Most RDBMSs use a row-oriented scheme, in which attributes of a record are stored together contiguously. However, in a column-oriented relational database management system (RDBMS) the values of individual columns are stored contiguously. At the storage level, the data may be divided into so-called "chunks" having a predefined, system-wide, size (e.g., containing hundreds or thousands of complete rows in a row-oriented scheme or single-column values in a column-oriented scheme).

When an RDBMS receives a query, typically in the form of a Structured Query Language (SQL) statement, a planner and optimizer component of the RDBMS determines a series of steps or operations for retrieving the requested information from the database. This series of steps is referred to as a query execution plan or query plan. In one architecture for executing a query plan, dedicated threads or processes (referred to as worker units) are used to carry out the steps. Each worker unit operates (e.g., adds values of two columns together, determines whether values of two columns are equal to each other, etc.) on one input chunk at a time to produce an output chunk for input to the next worker unit.

The planner and optimizer component may generate an optimized plan for query processing based on statistics for the data and the logic of the SQL statement. However, this procedure does not take into account the data organization and processing architecture.

BRIEF SUMMARY

According to one embodiment of the present invention, a system for processing queries analyzes statistical information of input data records in relation to a first operation for a query. The system applies the first operation to a plurality of groups of input data records to produce corresponding groups of output data records, and coalesces the sets of output data records to form larger sets of data records for input to a subsequent second operation for the query based on the analysis. Embodiments of the present invention further include a method and computer program product for processing queries in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to introducing operations for coalescing subsets of results into query plans. For example, when a planner/optimizer component of a column-oriented relational database management system (RDBMS) using a chunk-based query processing system finds a highly selective predicate expression in a Structured Query Language (SQL) statement, it may produce steps to coalesce small chunks of data to create larger chunks. The planner/optimizer may determine that a predicate is highly selective based on table statistics and a predetermined threshold.

One aspect of a present invention embodiment is to improve performance for processing queries. A typical SQL SELECT query running in an RDBMS system has a predicate expression, which when applied to a chunk may produce a chunk of smaller size by filtering or removing rows that do not satisfy the predicate. The predicate expression may be highly selective, resulting in chunks of very small sizes. This can result in significant performance degradation of the overall query processing in a column-wise RDBMS, since the overhead of invoking the processing units handling the query may be substantial compared to the actual transformation to be performed when these smaller sized chunks are passed through subsequent steps. Accordingly, a selectivity threshold for coalescing chunks may be set in present invention embodiments so that the performance overhead of the coalescing operation is less than the performance cost of performing subsequent steps on the smaller chunks.

Figure 1:
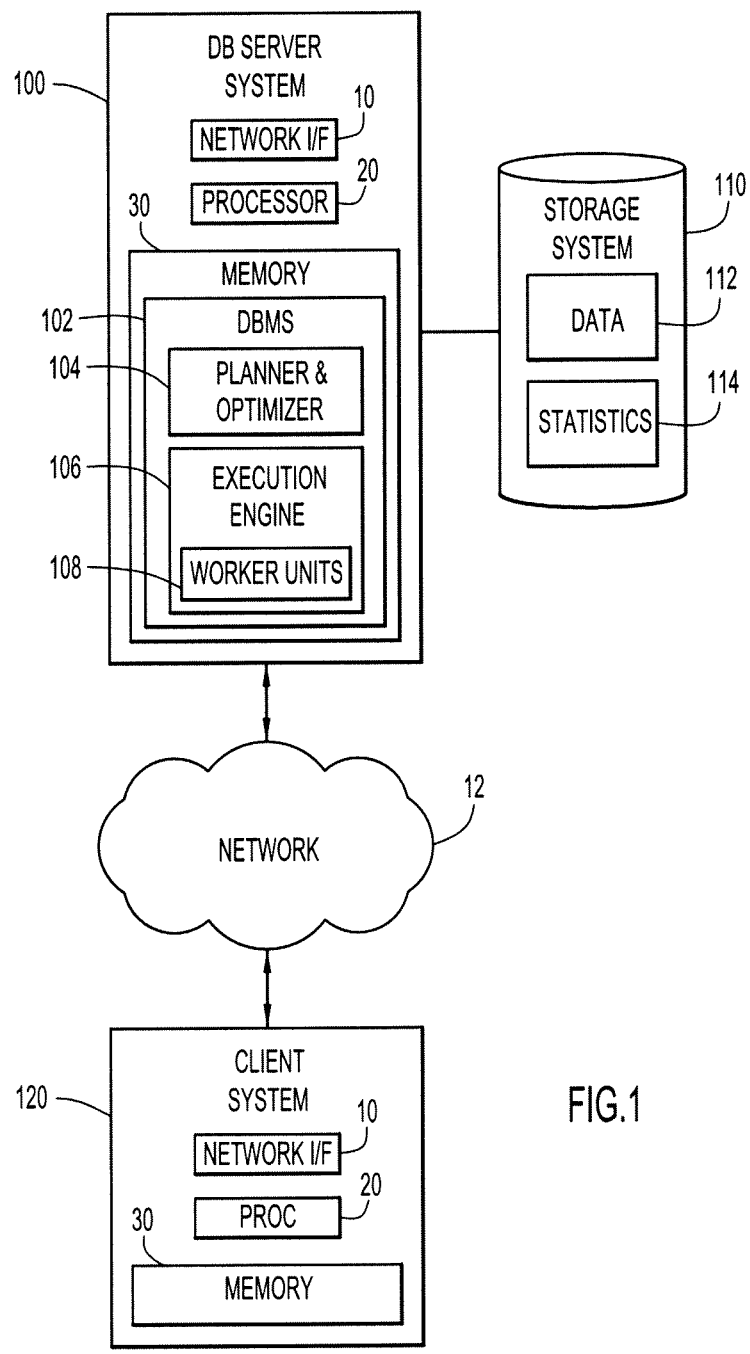
FIG. 1 is a diagrammatic illustration of an example environment for an embodiment of the present invention.

An example environment for present invention embodiments is illustrated in FIG. 1. Specifically, the environment includes one or more server systems 100, one or more storage systems 110, and one or more client or end-user systems 120. Server systems 100, storage systems 110, and client systems 120 may be remote from each other and communicate over a network 12.

Network 12 may be implemented by any number of any suitable communications media (e.g., wide area network (WAN), local area network (LAN), Internet, intranet, etc.). Alternatively, any number of server systems 100, storage systems 110, and client systems 120 may be local to each other, and communicate via any appropriate local communication medium (e.g., local area network (LAN), hardwire, wireless link, intranet, etc.).

Server system 100 includes a database management system (DBMS) 102 (e.g., a column-oriented relational database management system (RDBMS) using chunk-based query processing and storage). DBMS 102 provides access to data stored in storage system 110. The DBMS may be implemented across plural server systems. Alternatively, the DBMS may reside on a client system 120 or other computer system in communication with the client system. DBMS 102 may include planner/optimizer module 104 and execution engine 106. Planner/optimizer 104 analyzes queries received by the DBMS and generates a query plan. Execution engine 106 carries out the query plan, and may use worker units 108 to perform operations of the query plan. For example, the worker units may be threads and/or may reside within a pool of worker units.

Storage system 110 stores data 112 (e.g., table data, system data, statistics 114 that describe the table data, etc.). Alternatively, statistics 114 may be stored remotely from data 112.

Client systems 120 enable users to communicate with the DBMS (e.g., via network 12). The client systems may present any graphical user (e.g., GUI, etc.) or other interface (e.g., command line prompts, menu screens, etc.) to receive commands from users and interact with the DBMS and/or other modules or services.

Server systems 100 and client systems 120 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., communications software, DBMS software, etc.). Storage system 110 may be implemented by any conventional or other storage device including any computer readable storage media.

The DBMS, planner/optimizer, execution engine, and worker threads may include one or more modules or units to perform the various functions of present invention embodiments described below (e.g., parsing queries, estimating selectivity of a predicate, inserting coalesce operations into query plans, performing query plan operations, etc.), may be implemented by any combination of any quantity of software and/or hardware modules or units, and may reside within memory 30 of a server system and/or client systems for execution by processor 20.

Figure 2:
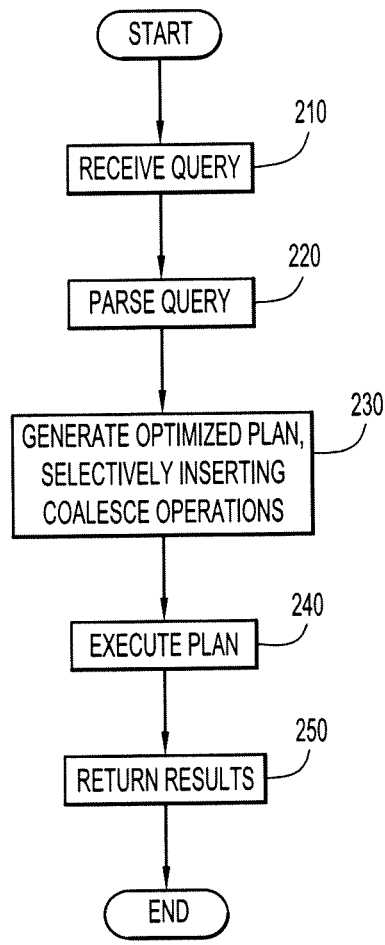
FIG. 2 is a flow diagram illustrating an example manner of processing a query according to an embodiment of the present invention.

An example manner of processing a query according to an embodiment of the present invention is illustrated in FIG. 2. Initially, DBMS 102 receives a query (e.g., from client system 120 via network 12) at step 210. At step 220, the DBMS parses the received query statement and generates a tree representation of the query.

At step 230, planner/optimizer 104 receives the tree representation and generates an optimized query plan. Generating the optimized query plan includes selectively inserting coalesce operations. For example, the planner/optimizer may insert steps to coalesce chunks output from a filtering operation into larger size chunks (e.g., chunks with a number of rows up to a predetermined threshold (e.g., 2056, 4096, 10000, etc.)) if it is determined that governing criteria are satisfied. Otherwise, the planner/optimizer may omit those steps from the query plan (e.g., if the expected performance benefit of coalescing chunks is less than the expected cost, if the expected selectivity of the filter operation exceeds a predetermined threshold, etc.). Generating the optimized query plan may include generating a plurality of plans and selecting an optimal plan (e.g., based on heuristic rules, computation of one or more figures of merit (e.g., throughput, latency, etc.), etc.).

At step 240, the execution engine receives the optimized query plan, accesses the data, and executes the query plan (e.g., using worker units 108 to perform operations of the plan on individual chunks of data) to produce query results. The execution engine coalesces chunks between operations as provided for in the query plan. The execution engine may receive the plan in the form of instructions that the execution engine may interpret and/or compile for execution. Alternatively, the execution engine may receive some or all of the instructions for the query plan as pre-compiled instructions. The DBMS returns the query results at step 250.

Figure 3:
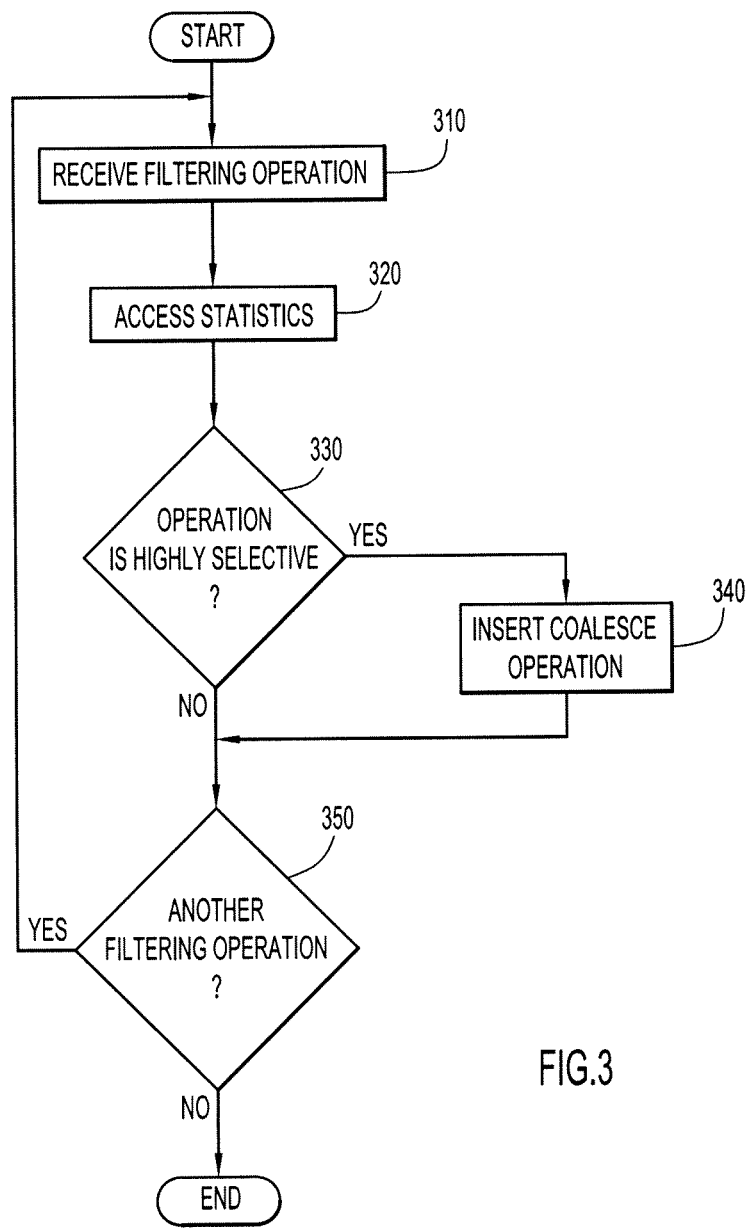
FIG. 3 is a flow diagram illustrating an example manner of selectively inserting coalesce operations into a query plan according to an embodiment of the present invention.

An example manner of selectively inserting coalesce operations into a query plan according to an embodiment of the present invention is illustrated in FIG. 3. In particular, at step 310, planner/optimizer 104 receives a filtering operation (e.g., a query predicate, etc.) that may be used in a plan for the query. The filtering operation may reduce the data (e.g., produce fewer rows for output).

At step 320, the planner/optimizer accesses statistics 114 for the data to be filtered by the received operation. The statistics may be stored or cached in memory 30, system tables metadata stored in storage system 110, or elsewhere. The statistics may be produced by the RDBMS and may include, for example, the number of rows, number of distinct values, maximum value, minimum value, one or more most frequent values, dispersion statistics (e.g., standard deviation, range, interquartile range, etc.), histogram, or other quantities or data objects for individual columns.

At step 330, the planner/optimizer determines whether the received operation is highly selective based on the statistics for the data on which the operation will act. The selectivity of the operation may be defined as the number of rows output from the operation divided by the number of rows input to the operation. If the estimated or predicted selectivity is less than a predetermined threshold (e.g., 0.001, 0.01, 0.2, 0.1, etc.) then the operation is considered highly selective. The selectivity threshold may vary with context for a particular operation (e.g., the type of operation, height of the query graph, whether the data is in a compressed format, etc.). The threshold or thresholds may be tuned for particular DBMS configurations (e.g., default maximum chunk size, design of the data handshake between operators, etc.), hardware, data, and usage environments by, for example, testing the performance of query processing under a range of thresholds for a representative sample of queries or for a particular subset of queries (e.g., expected queries with highly selective predicates).

One manner in which the planner/optimizer may estimate or predict selectivity is to use a histogram of the values in a column to approximate the distribution of values on which the operator will act. Another manner of estimating selectivity is to assume column values are uniformly distributed over their range (e.g., for <, >, ≤, or ≥ comparisons) or among the distinct values in the column (e.g., for = or ≠ comparisons). For example, the selectivity of applying the predicate "T.X=66219," where T is a table and X a column of the table, may be estimated as 1/n, where n is the number of distinct values in column X of Table T.

The planner/optimizer may analyze these operations in any order and at any stage of generating and optimizing query plans. For example, the planner/optimizer may loop over selection operations of a candidate query plan, or may analyze each application of a predicate expression as a candidate plan is generated (e.g., from a parse tree for a SQL statement).

If the operation is determined to be highly selective at step 330, the planner/optimizer inserts, at step 340, a coalesce operation after the filtering operation. The coalesce operation may, for example, store received chunk data and output a chunk of a predetermined size when the number of stored rows equals or exceeds the predetermined size, deleting the rows output from the store and retaining any remaining rows until the next merged output chunk is to be emitted.

In either case, processing proceeds to step 350, and the planner/optimizer determines if there is another filtering operation for the query plan. If so, processing proceeds to step 310. Otherwise processing ends.

An example illustrates the operation of the planner/optimizer according to an embodiment of the present invention. In this example, a column-oriented database contains an Employee table including Salary and ZipCode columns. The table may include a large amount of data (e.g., billions of records) with chunks of a predetermined size (e.g., 4096 rows) in a column-oriented store. The DBMS receives the following SQL statement:

SELECT Salary+100 FROM Employee WHERE ZipCode=66219.

In response, the planner/optimizer may produce a query plan described in pseudo-code as comprising the following steps:
(a) Scan the Employee table for its required columns (Salary and ZipCode).
(b) Apply the predicate ZipCode=66219 to determine matching rows.
(c) Filter to produce data with only matching rows.
(c.1) Coalesce chunks into larger size (e.g., 4096 rows).
(d) Add 100 to Salary column.
(e) Return data.

In generating this plan, the planner/optimizer looks at the statistics for the Employee.ZipCode column and finds that a very small percentage of records in the Employee table match or are expected to match the predicate "ZipCode=66219." As a result, the planner/optimizer adds the step (c.1) to coalesce data chunks into larger size chunks of up to the predetermined size for all the columns. This results in a smaller number of chunks on which the operation to evaluate the expression "Salary+100" must be invoked. Alternatively, the planner optimizer may omit step (c.1) if it determines that the percentage of records expected to match the predicate is not small. In this plan, step (b) may receive chunks of single column data (ZipCode) and produce output chunks of Boolean values indicating which rows satisfy the predicate expression. Step (c) receives a Boolean chunk and single column chunk (Salary) and determines which rows of the Salary column to include in the output based on the corresponding values in the Boolean chunk.

Another example illustrates a manner in which the planner/optimizer may process a query including a join predicate using hash join. In this example, the database includes tables T12 and Txy. Table T12 has integer columns c1 and c2. Table Txy has integer columns x and y. The DBMS receives the following SQL statement:

SELECT c1+100 from T12, Txy WHERE T12.c2=Txy.cy and Txy.cx=120.

In response, the planner/optimizer may produce a query plan described in pseudo-code as comprising the following steps:
(a) Scan table T12 for columns c1 and c2.
(b) Scan table Txy, for columns cy and cx, applying predicate cx=120.
(b.1) Coalesce Txy chunks.
(c) Begin join with Txy as the inner table and T12 as outer table (based on join optimization).
(d) Generate hash table for column cy.
(e) Generate hash of column c2 and lookup results in the hash table to produce chunks of Boolean values, where for all matching rows of c2, the Boolean value will be true and for others, it will be false.
(f) Generate filtered chunks of c1 based on corresponding Boolean values.
(f.1) Coalesce c1 chunks into larger size of up to 4096 rows.
(g) Add 100 to filtered chunks of c1.
(h) Return data.

In generating this plan, the planner/optimizer determines that the selectivity of the join is very low and therefore inserts coalesce operations resulting in a smaller number of chunks on which the operation to evaluate the expression "c1+100" must be invoked. In particular, the planner/optimizer determines that the predicate "Txy.cx=120" is highly selective. As a result, the planner/optimizer adds step (b.1) to coalesce data chunks for table Txy into larger size chunks. Alternatively, the planner optimizer may omit step (b.1) if it determines that the percentage of records expected to match the predicate is not small. Steps (c)-(f) perform a hash join on tables Txy and T12, where step (d) may receive chunks of single column data (cy), and step (e) produces output chunks of Boolean values indicating which rows of table T12 satisfy "T12.c2=Txy.cy" (for rows of Txy that satisfy "Txy.cx=120"). Step (f) receives the Boolean chunks and single column chunks (for column c1) and determines which rows of the column c1 to include in the output based on the corresponding values in the Boolean chunks. The planner/optimizer determines from estimating the results of the join operation that step (f) will produce relatively few rows. As a result, the planner/optimizer adds another coalesce operation at step (f.1).

Figure 4:
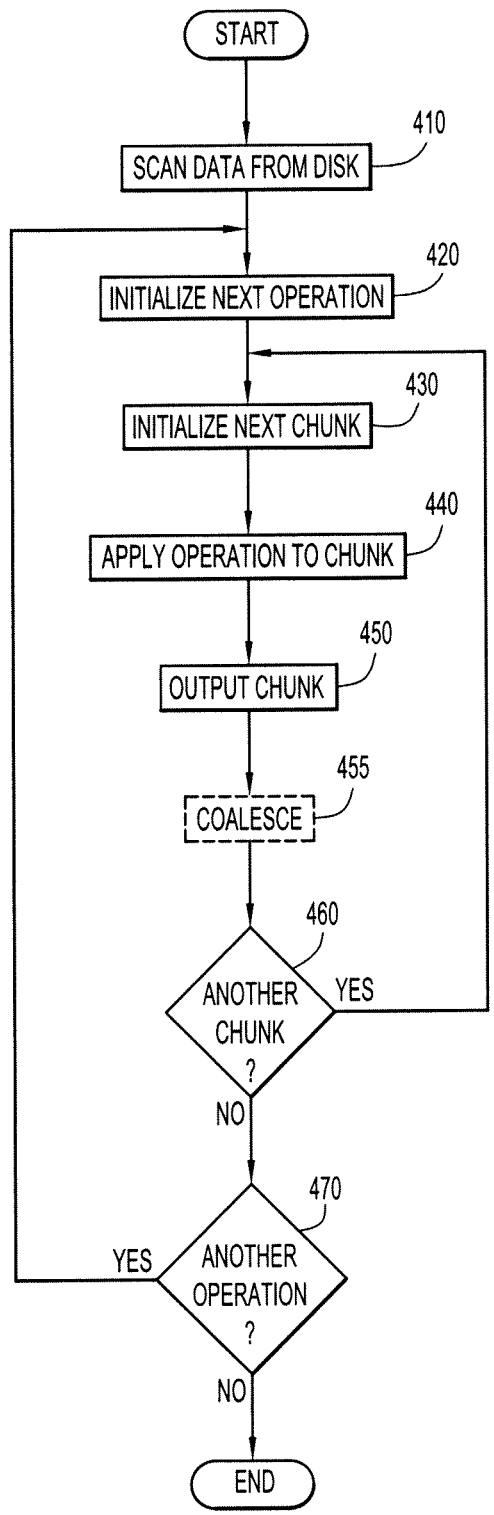
FIG. 4 is a flow diagram illustrating an example manner of executing a query plan according to an embodiment of the present invention.
Figure 5A:
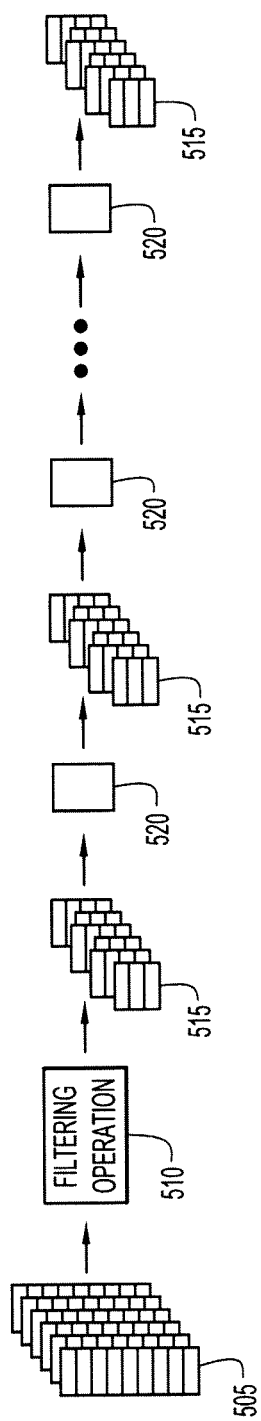
FIG. 5A is a block diagram illustrating an example data flow for query execution without coalescing after a filter operation according to an embodiment of the present invention.
Figure 5B:
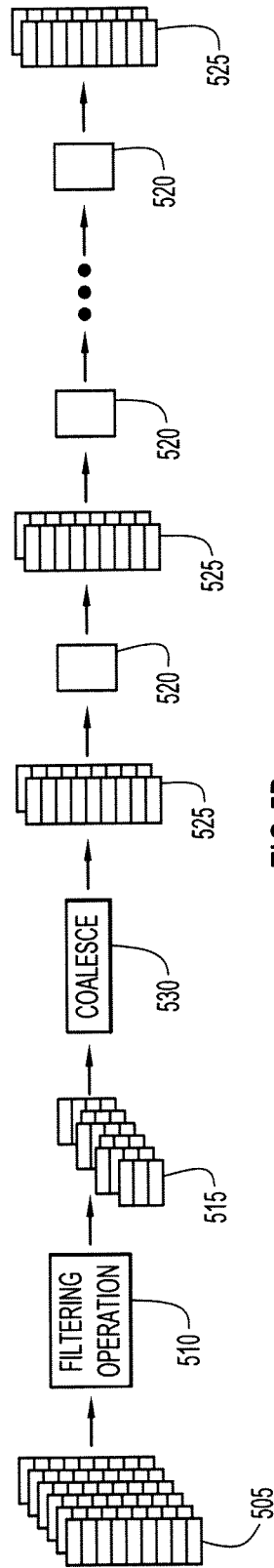
FIG. 5B is a block diagram illustrating an example data flow for query execution with coalescing after a filter operation according to an embodiment of the present invention.

An example manner of executing a query plan according to an embodiment of the present invention is illustrated in FIGS. 4, 5A, and 5B. In particular, at step 410, execution engine 106 reads data from storage system 110. For example, data for a column X of table T may be stored in column-oriented format segmented in chunks on disk, and the column data may be read from disk to chunks 505 (FIGS. 5A and 5B) that typically have a common predefined size. At step 420, the execution engine initializes an operation to act upon data according to the query plan. For example, the execution engine may configure a worker unit 108 to perform the operation. The operation may be a filtering operation 510 (FIGS. 5A and 5B) that applies a predicate to select matching rows, or it may be a non-filtering operation 520 (FIGS. 5A and 5B). Initialization may include, for example, resource management, loading instructions for the operation, loading parameters for the operation, and the like. At step 430, a chunk is initialized as input for the operation. For example, the chunk may be loaded and formatted in an input buffer for the operation.

At step 440, the operation is applied to the chunk. For example, the worker unit may determine which rows of the chunk satisfy a predicate or apply a transformation. At step 450, the operation produces an output chunk. For example, filtering operation 510 may produce smaller size chunks 515 than the corresponding input chunks 505. The query plan may include a coalesce operation 530 after a filtering operation 510, in which case the coalesce operation receives the output of the filtering operation and performs steps to coalesce chunks at step 455. For example, the coalesce operation may store received chunk data, and when the number of stored rows equals or exceeds a predetermined maximum chunk size, the coalesce operation outputs a chunk of the predetermined maximum size, deletes the rows output from the store, and retains any remaining rows until it is ready to output the next chunk.

At step 460, the execution engine determines whether another chunk remains to for input to the current operation 510 or 520. If so, processing returns to step 430. Otherwise, at step 470, the coalesce operation, if used, outputs any remaining stored rows, and the execution engine determines whether another operation 510 or 520 remains to be performed. If another operations remains to be performed, processing returns to step 420. Otherwise, processing ends. Thus, if filtering operation 510 outputs a small fraction of the input records (e.g., one percent), and the smaller output chunks 515 are coalesced, subsequent operations on the output chunks will be invoked much less often than if the chunks are not coalesced. In a query with many operations, this may have a large effect on performance.

It will be appreciated that the embodiments described above and illustrated in the drawings represent only a few of the many ways of implementing embodiments for coalescing query results.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for any query processing based on a chunk model. Any type of information store may be queried (e.g., relational database, non-relational database, index, search engine, etc.). A determination of whether to coalesce may be made at any stage of query processing (e.g., during planning, optimization, dynamically during query execution, etc.) based on any criteria (e.g., a predetermined selectivity threshold, a throughput or latency estimate based on a model of query performance, etc.) and data (e.g., column statistics, table statics, correlations between columns, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for processing queries comprising:
at least one processor configured to:
analyze, in a column-wise relational database management system, statistical information of input data records in relation to a first operation for a query, wherein the input data records are divided into chunks having a predefined, system-wide, size, the first operation is a filtering operation that produces output groups of a smaller size than the chunks of the input data records, and the analysis comprises estimating a selectivity value that depends upon a number of output records for the first operation;
set a predetermined threshold such that a performance overhead of a coalescing operation on the output groups is less than a performance cost of performing subsequent steps on the produced output groups;

apply the first operation to the chunks of the input data records to produce the corresponding output groups of output data records;

in response to the selectivity value being below the predetermined threshold, coalesce the output groups of the output data records to form larger output groups of the output data records for input to a subsequent second operation for the query based on the analysis;

generate a plan to determine query results, wherein the plan comprises the first and second operations; and insert a coalescing operation into the plan to operate on the output groups of the output data records in response to the selectivity value being below the predetermined threshold.

2. The system of claim 1, wherein the chunks of the input data records comprise input column oriented data chunks of a relational database management system (RDBMS).

3. The system of claim 2, wherein the chunks of the input data records further comprise chunks of Boolean values corresponding to the input column oriented data chunks, and the output groups of the output data records comprise column oriented data chunks containing values from the input column oriented input data chunks indicated by the Boolean values.

4. The system of claim 1, wherein the estimating the selectivity value comprises estimating a ratio of output records to input records for the operation.

5. The system of claim 1, wherein the query comprises a Structured Query Language (SQL) SELECT statement.

6. The system of claim 1, wherein the query includes a join and the first operation produces results of the join.

7. A computer program product for processing queries comprising:

a computer readable storage medium having computer readable program code embodied therewith for execution on a processing system, the computer readable program code comprising computer readable program code configured to:

analyze, in a column-wise relational database management system, statistical information of input data records in relation to a first operation for a query, wherein the input data records are divided into chunks having a predefined, system-wide, size, the first operation is a filtering operation that produces output groups of a smaller size than the chunks of the input data records, and the analysis comprises estimating a selectivity value that depends upon a number of output records for the first operation;

set a predetermined threshold such that a performance overhead of a coalescing operation on the output groups is less than a performance cost of performing subsequent steps on the produced output groups;

apply the first operation to the chunks of the input data records to produce corresponding output groups of output data records;

in response to the selectivity value being below the predetermined threshold, coalesce the output groups of the output data records to form larger output groups of the output data records for input to a subsequent second operation for the query based on the analysis;

generate a plan to determine query results, wherein the plan comprises the first and second operations; and insert a coalescing operation into the plan to operate on the output groups of the output data records in response to the selectivity value being below the predetermined threshold.

8. The computer program product of claim 7, wherein the chunks of the input data records comprise input column oriented data chunks of a relational database management system (RDBMS).

9. The computer program product of claim 8, wherein the chunks of the input data records further comprise chunks of Boolean values corresponding to the input column oriented data chunks, and the output groups of the output data records comprise column oriented data chunks containing values from the input column oriented input data chunks indicated by the Boolean values.

10. The computer program product of claim 7, wherein the estimating the selectivity value comprises estimating a ratio of output records to input records for the operation.

11. The computer program product of claim 7, wherein the query comprises a Structured Query Language (SQL) SELECT statement.

* * * * *